(12) United States Patent
Shippy

(10) Patent No.: US 9,164,570 B2
(45) Date of Patent: Oct. 20, 2015

(54) DYNAMIC RE-CONFIGURATION FOR LOW POWER IN A DATA PROCESSOR

(71) Applicant: Advanced Micro Devices, Inc., Sunnyvale, CA (US)

(72) Inventor: David J. Shippy, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 298 days.

(21) Appl. No.: 13/714,011

(22) Filed: Dec. 13, 2012

(65) Prior Publication Data

US 2014/0173312 A1   Jun. 19, 2014

(51) Int. Cl.
*G06F 1/32* (2006.01)
*G06F 9/50* (2006.01)

(52) U.S. Cl.
CPC ............ *G06F 1/3243* (2013.01); *G06F 1/3287* (2013.01); *G06F 1/3293* (2013.01); *G06F 9/5094* (2013.01); *Y02B 60/121* (2013.01); *Y02B 60/1239* (2013.01); *Y02B 60/1282* (2013.01)

(58) Field of Classification Search
CPC ... G06F 1/3243; G06F 1/3287; G06F 1/3293; G06F 9/5094; Y02B 60/121; Y02B 60/1282; Y02B 60/1239
See application file for complete search history.

(56) References Cited

U.S. PATENT DOCUMENTS

| | | | |
|---|---|---|---|
| 5,634,131 A | 5/1997 | Matter et al. | |
| 7,865,667 B2 * | 1/2011 | Kohn et al. | 711/119 |
| 7,962,770 B2 * | 6/2011 | Capps et al. | 713/300 |
| 8,086,825 B2 | 12/2011 | Shen et al. | |
| 8,171,319 B2 * | 5/2012 | Ghiasi et al. | 713/321 |
| 8,321,362 B2 * | 11/2012 | Carrizo et al. | 706/45 |
| 2009/0164812 A1 * | 6/2009 | Capps et al. | 713/320 |
| 2010/0268968 A1 * | 10/2010 | Ghiasi et al. | 713/300 |
| 2012/0198207 A1 * | 8/2012 | George et al. | 712/36 |

OTHER PUBLICATIONS

Peter Greenhalgh; "Big.LITTLE Processing with ARM Cortex-A15 & Cortex-A7"; White Paper; Sep. 2011; 8 pages; ARM Limited,150 Rose Orchard Way, San Jose, CA 95134-1358 USA.
NVIDIA Corporation; "Variable SMP—A Multi-Core CPU Architecture for Low Power and High Performance"; White Paper; 2011; 16 pages; NVIDIA Corporation, 2701 San Tomas Expressway at Walsh Avenue, Santa Clara, CA 95050.

* cited by examiner

*Primary Examiner* — M Elamin
(74) *Attorney, Agent, or Firm* — Polansky & Associates, P.L.L.C.; Paul J. Polansky

(57) ABSTRACT

A data processor includes an execution unit having a multiple number of redundant resources, and a configuration circuit having first and second modes, wherein in the first mode, the configuration circuit enables the multiple number of redundant resources, and in the second mode, the configuration circuit disables the multiple number of redundant resources.

21 Claims, 5 Drawing Sheets

DYNAMIC RE-CONFIGURATION FOR LOW
POWER IN A DATA PROCESSOR

FIELD

This disclosure relates generally to data processors, and more specifically to configurable data processors.

BACKGROUND

Data processors are typically designed to meet specific product needs. For example, desktop microprocessors operate at very high speeds and have long execution pipelines and multiple parallel resources to achieve very high performance. Microprocessors for laptop computers offer reasonably high performance but have low power features to lengthen battery life. Embedded microprocessors operate at relatively slow speeds and have simple architectures in order to reduce product cost.

Certain products such as multimedia mobile devices can at various times require either high performance or low power consumption. For example when running certain games, a multimedia mobile device requires the microprocessor to provide high performance. However when running other tasks such as EMAIL, the multimedia mobile device requires much lower performance from the microprocessor. These varying processing environments make it difficult for the microprocessor designer to achieve the right balance between performance and preservation of battery life.

Figure 1:
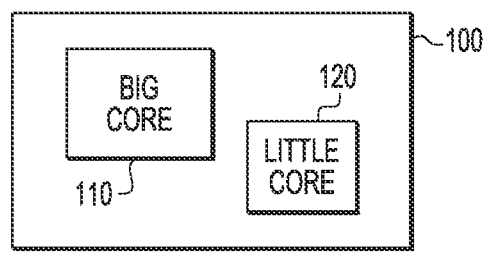
FIG. 1 illustrates in block diagram form a data processor known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE
EMBODIMENTS

FIG. 1 illustrates in block diagram form a data processor 100 known in the prior art. Data processor 100 generally includes a big core 110 and a little core 120.

In operation, big core 110 and little core 120 each have the capability to execute the same instruction set. However, the micro-architecture of big core 110 is constructed to support high intensity tasks and the micro-architecture of little core 120 is constructed to support low power and low intensity tasks.

For one particular example, big core 110 is a core known as the Cortex A15 core available from Advanced RISC Machines, Ltd. of Cambridge, G.B, and has the capability to decode, dispatch, issue and execute multiple, out-of-order instructions. Big core 110 operates multiple pipelines having 15 to 24 stages. On the other hand, little core 120 is a core known as the Cortex A7 core also available from ARM Ltd. and decodes, dispatches, issues, and executes in-order instructions and operates a smaller number of pipelines, having 8 to 10 stages.

Depending on the intensity and target power consumption of a task, data processor 100 migrates instructions to big core 110 or to little core 120. However data processor 100 consumes additional silicon area for little core 120, and in general, data processor 100 requires overhead to migrate instructions between the two cores when the processing task changes.

Figure 2:
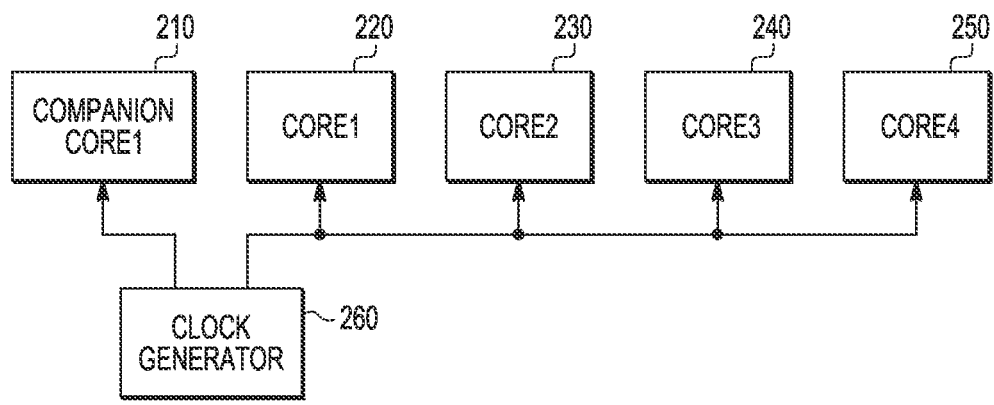
FIG. 2 illustrates in block diagram form another data processor known in the prior art.

FIG. 2 illustrates in block diagram form another data processor 200 known in the prior art. Data processor 200 generally includes a companion core 210 labeled "COMPANION CORE1", a main core 220 labeled "CORE1", a main core 230 labeled "CORE2", a main core 240 labeled "CORE3", a main core 250 labeled "CORE4", and a clock generator 260.

Companion core 210 has a clock input. Main cores 220, 230, 240, and 250 each have a clock input. Clock generator 260 has a first output connected to the clock input of companion core 210 and a second output connected to each clock input of main cores 220, 230, 240, and 250.

In operation, main cores 220, 230, 240, and 250 (forming a quad core cluster) and companion core 210 each have the capability to execute the same instruction set. Although main cores 220, 230, 240, and 250 and companion core 210 execute instructions in a consistent way, data processor 200 enables and disables cores based on the work load. For example, data processor 200 could enable only companion core 210 to execute low intensity tasks such as audio, video, and email, only two main cores to execute higher intensity tasks such as flash enabled browsing and multitasking, and all four main cores to execute high intensity tasks such as console class gaming and media processing.

Main cores 220, 230, 240, and 250 are each constructed to support high frequency, performance intensive tasks, whereas companion core 210 is constructed to support low frequency, low power, low intensity tasks. Clock generator 260 provides a high frequency clock to main cores 220, 230, 240, and 250, but provides a low frequency clock to companion core 210.

However, depending on the intensity and target power consumption of a task, CPU power management hardware and the operating system migrate instructions to selected ones of main cores 220, 230, 240, and 250 or to companion core 210. Like data processor 100, data processor 200 consumes additional silicon area to operate companion core 210, and in general, data processor 200 requires overhead to migrate instructions between any of cores 220-250 and companion core 210 when the processing task changes.

Figure 3:
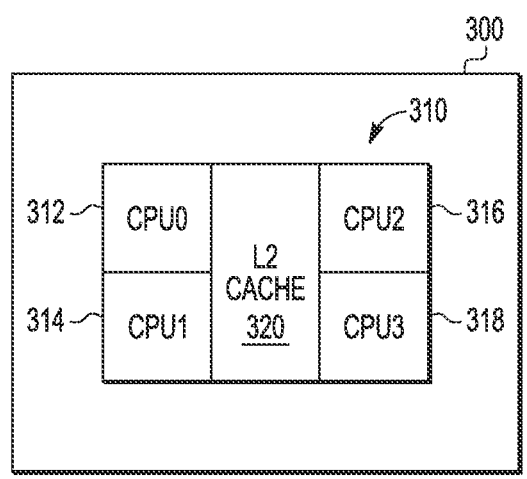
FIG. 3 illustrates in block diagram form a data processor according to some embodiments.

FIG. 3 illustrates in block diagram form a data processor 300 according to some embodiments. Data processor 300 generally includes a CPU cluster 310. CPU cluster 310 includes a CPU core 312 labeled "CPU0", a CPU core 314 labeled "CPU1", a CPU core 316 labeled "CPU2", a CPU core 318 labeled "CPU3", and a cache 320 which is a shared L2 cache.

In operation, CPU cores 312-318 each include a fetch unit for fetching a stream of instructions, an execution unit connected to the fetch unit that has a multiple number of redundant resources, and a configuration circuit that operates in a first mode and a second mode. In the first mode, the configuration circuit enables the multiple number of redundant resources, and in the second mode, the configuration circuit selectively disables the multiple number of redundant resources.

Each of CPU cores 312-318 has the capability to execute the same instruction set. Also, each CPU core has a substantially identical architecture and executes instructions in a consistent way. Unlike data processors 100 and 200, however, data processor 300 can configure the micro-architecture of each of CPU cores 312-318 to support either high intensity tasks or low intensity tasks, where the associated CPU is configured for desired power management and in some applications, longest potential battery life.

For example, data processor 300 could configure CPU cores 312 and 314 to decode, dispatch, issue, and execute multiple out-of-order instructions, and to operate multiple pipelines each having a multiple number of stages. On the other hand, data processor 300 could re-configure CPU cores 316 and 318 to decode, dispatch, issue, and execute instructions using a smaller number of pipelines.

For example, to reduce the power of data processor 300 for low intensity tasks, data processor 300 functionally throttles, for example, CPU core 312 and gates off CPU core 314, CPU core 316, and CPU core 318. Subsequently, data processor 300 would execute instructions using CPU core 312. By eliminating a dedicated little core, data processor 300 preserves silicon area and saves power.

On the other hand to increase performance, data processor 300 reconfigures CPU cores 312-318 to perform high intensity tasks, by modifying at least one pipeline for high intensity operation, by increasing a width of a decode pipeline, by enabling an execution pipeline, and/or by enabling or disabling portions of one or more caches, while managing the high frequency, high intensity operation of each core.

Like data processor 200, data processor 300 processes instructions using a quad core cluster. However, depending on the intensity of the task, the desired performance level, and the desired power consumption target, CPU cores 312, 314, 316, and/or 318 can be dynamically and selectively reconfigured. CPU power management hardware and the operating system can migrate instructions to any CPU core. As should be apparent, in some embodiments a data processor can have other than four cores that can be dynamically and selectively reconfigured.

Figure 4:
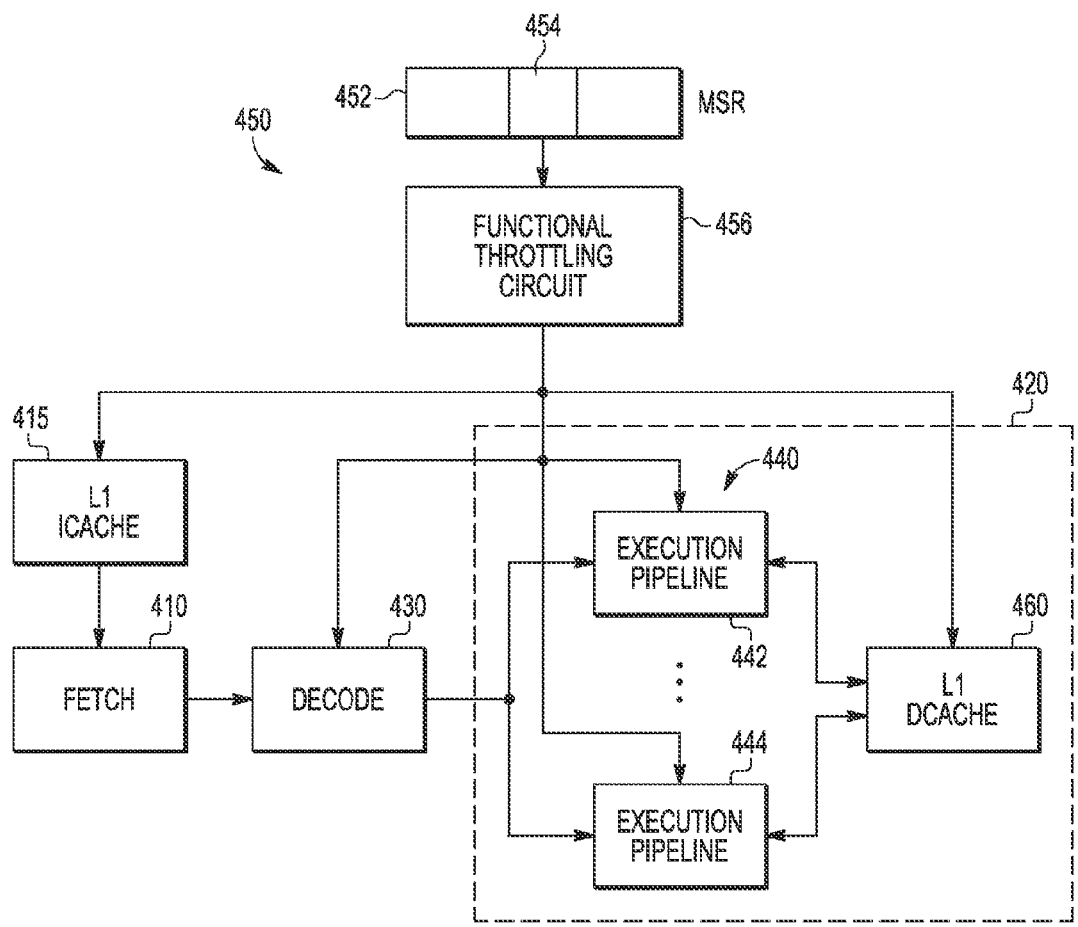
FIG. 4 illustrates in block diagram form a central processing unit (CPU) core that may be used in the data processor of FIG. 3 according to some embodiments.

FIG. 4 illustrates in block diagram form a central processing unit (CPU) core 400 that may be used in data processor 300 of FIG. 3 according to some embodiments. CPU core 400 generally includes a fetch unit 410, a level one instruction cache ("L1 ICACHE") 415, an execution unit 420, a decode unit 430, and a configuration circuit 450.

Fetch unit 410 has an input/output port and an output for providing instructions fetched from cache 415 or main memory. Cache 415 has an input, and an input/output port connected to the input/output port of fetch unit 410. Execution unit 420 includes multiple execution pipelines 440 including exemplary execution pipelines 442 and 444, and a level one data cache ("L1 DCACHE") 460. Decode unit 430 has a first input connected to the output of fetch unit 410, a second input, and an output. Execution pipeline 442 has a first input connected to the output of decode unit 430, a second input, and a data input/output port. Execution pipeline 444 has a first input connected to the output of decode unit 430, a second input, and a data input/output port. Cache 460 has an input and data input/output ports connected to the data input/output ports of one or more execution pipelines such as execution pipelines 442 and 444, depending on their respective function.

Configuration circuit 450 includes a register 452 and a functional throttling circuit 456. Register 452 is a model specific register (MSR) that includes a field 454 defining a mode of CPU core 400, and has an output for providing the contents of field 454. Functional throttling circuit 456 has an input connected to the output of register 452, an output connected to the input of cache 415, the second input of decode unit 430, the second input of execution pipelines 442 and 444, and the input of cache 460.

In operation, fetch unit 410 fetches a stream of instructions from cache 415 (or main memory through cache 415 if the fetch misses in cache 415), and provides the instructions to decode unit 430. Decode unit 430 decodes the instructions and dispatches them to selected execution units for execution. Execution unit 420 includes redundant resources that are not needed to execute the instruction set of CPU core 400. For example, execution unit 420 may have two identical pipelines that can be used to execute the same type of instruction. Also each execution pipeline may queue a large number of operations to handle high workloads without stalling decode unit 430 but can operate properly with a smaller queue. Moreover, decode unit 430 can decode multiple operations in parallel to increase throughput. Each of these features is useful for meeting the performance requirements of high intensity tasks, but consumes unneeded power for low intensity tasks. In addition, each of caches 415 and 460 have configurable sizes and can operate at full size for high intensity tasks, or reduced size for low intensity tasks.

Configuration circuit 450 has at least a first mode and a second mode. In the first mode, configuration circuit 450 causes CPU core 400 to operate as a "big core" by enabling the redundant resources. In the second mode, configuration circuit 450 causes CPU core 400 to operate as a "little core" by disabling the redundant resources. Thus a single, generic core can easily be reconfigured for different processing tasks.

Moreover by using a model specific register that can only be accessed in privileged mode to establish the mode of operation, CPU core 400 provides a protected mechanism to dynamically reconfigure CPU core 312, CPU core 314, CPU core 316, and/or CPU core 318 by writing field 454 of register 452.

Figure 5:
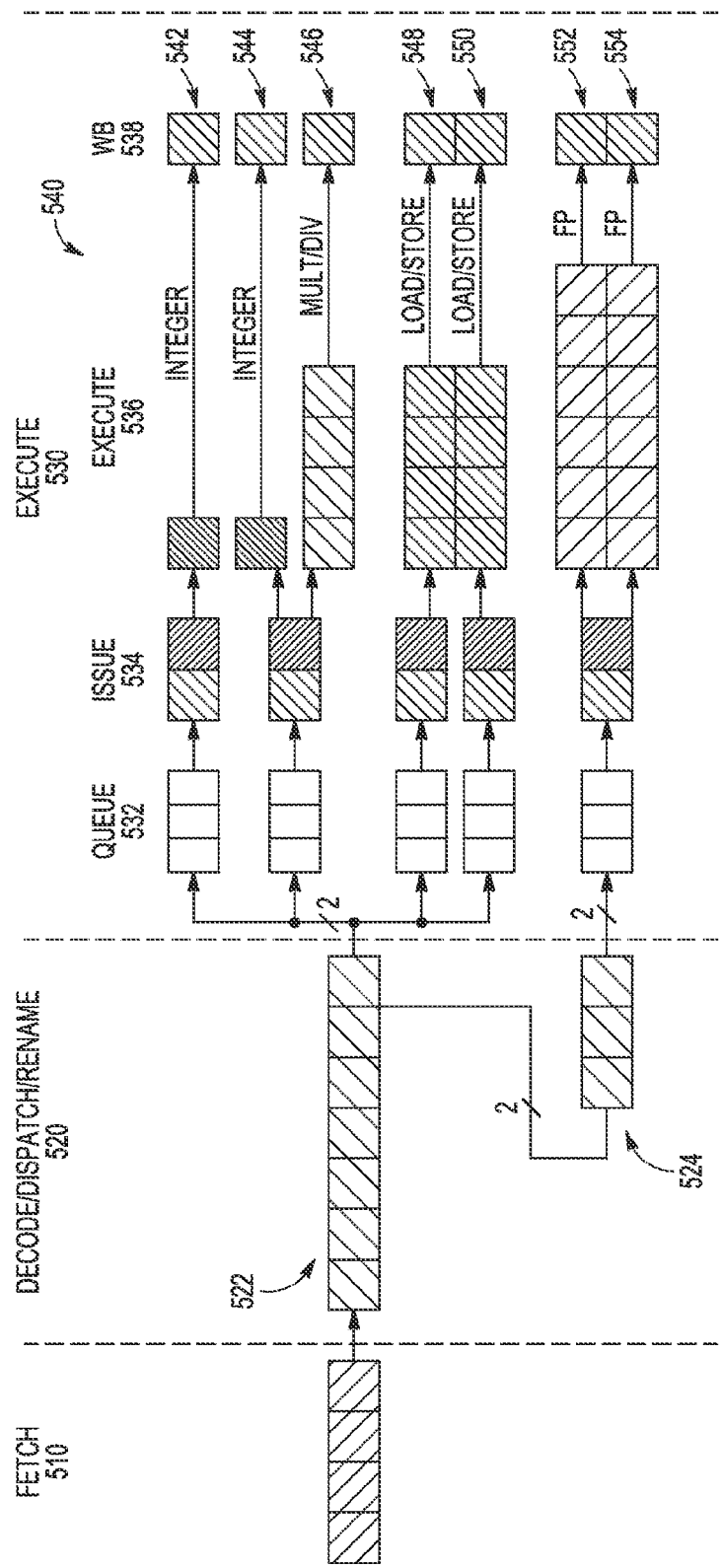
FIG. 5 illustrates in block diagram form a pipeline of the CPU core of FIG. 4 in a first mode according to some embodiments.

FIG. 5 illustrates in block diagram form a pipeline 500 of CPU core 400 of FIG. 4 in a first mode according to some embodiments. Pipeline 500 generally includes a fetch stage 510, a decode/dispatch/rename stage 520, and an execute stage 530.

Fetch stage 510 is a four-deep stage that provides instructions in program order to decode/dispatch/rename stage 520. Decode/dispatch/rename stage 520 includes a seven-deep set of sub-stages 522 and a three-deep set of sub-stages 524 associated with floating point operations that can be recognized near the end of decode/dispatch/rename stage 520. Decode sub-stages 522 provide up to two decoded instructions in parallel to execute stage 530, whereas decode sub-stages 524 provide up to two decoded floating point instructions in parallel to execute stage 530.

Execute stage 530 includes a set of execution pipelines 540 each of which has its own corresponding pipeline segment organized into a queue sub-stage 532, an issue sub-stage 534, an execute sub-stage 536, and a writeback (WB) sub-stage 538. In pipeline 500, execution piplines 540 include an integer pipeline 542, an integer pipeline 544, a multiply divide ("Mult/Div") pipeline 546, a load/store pipeline 548, a load/store pipeline 550, a floating point ("FP") pipeline 552, and a FP pipeline 554. However the number and composition of the pipelines will vary in other embodiments.

Note that FIG. 5 shows each queue sub-stage 532 as having three entries but these are representative of an arbitrary number of multiple entries. For example, queue sub-stage 532 in integer pipeline 542 has twenty-four queue stages. FIG. 5 shows the remaining sub-stages with their actual depth. Moreover some execute pipelines, such as integer pipeline 544 and Mult/Div pipeline 546, share a common queue sub-stage as is illustrated in FIG. 5.

In operation, pipeline 500 represents the pipeline of CPU core 400 in the first mode, in which configuration circuit 450 enables the multiple redundant resources to support high frequency, high intensity tasks.

Figure 6:
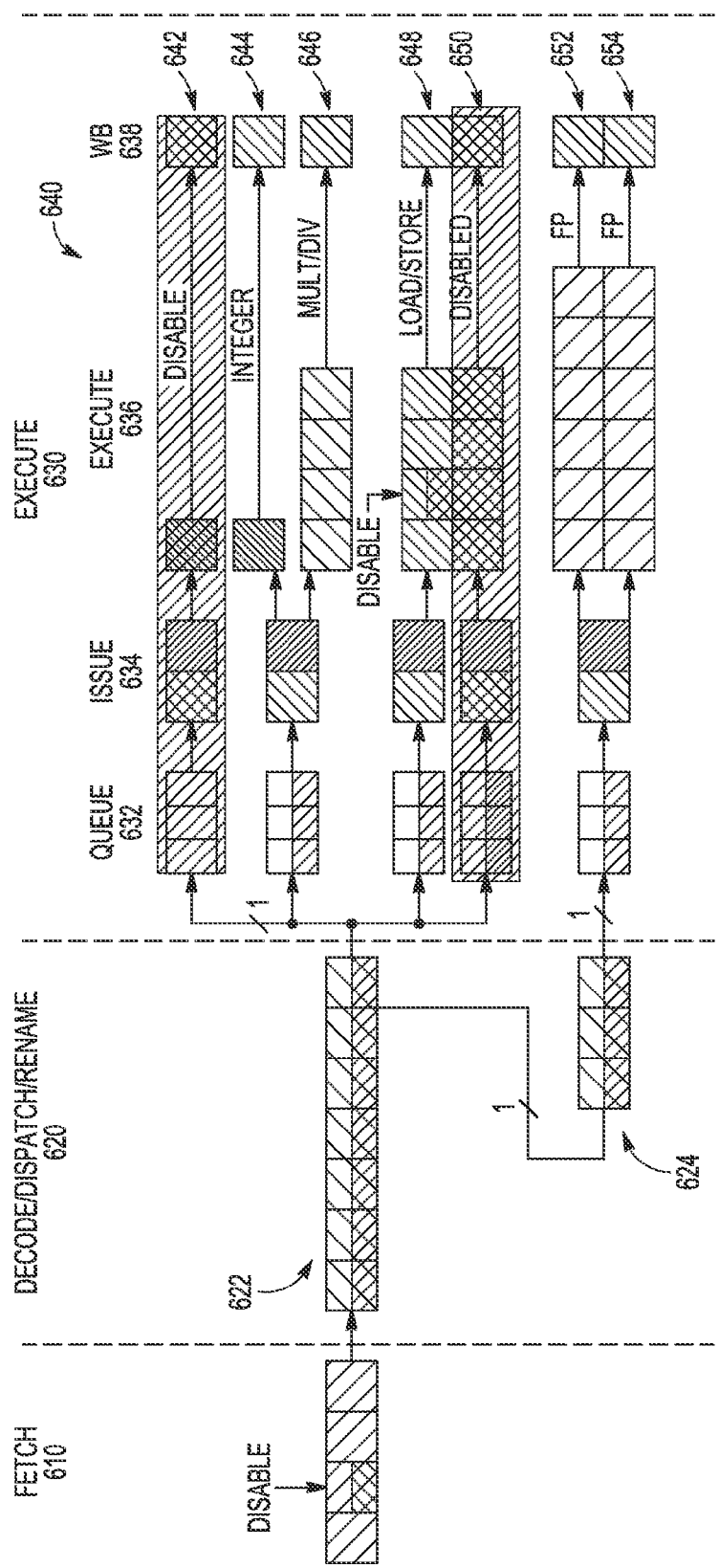
FIG. 6 illustrates in block diagram form a pipeline of the CPU core of FIG. 4 in a second mode according to some embodiments.

FIG. 6 illustrates in block diagram form a pipeline 600 of CPU core 400 of FIG. 4 in a second mode according to some embodiments. Pipeline 600 generally includes a fetch stage 610, a decode/dispatch/rename stage 620, and an execute stage 630 corresponding to fetch stage 510, decode/dispatch/rename stage 520, and execute stage 530, respectively of FIG. 5. However unlike pipeline 500, pipeline 600 identifies redundant resources that have now been disabled. Pipeline 600 illustrates four types of redundant resources. First, since integer pipeline 642 and 644 both execute the same types of instructions, the second one is redundant and CPU core 400 disables integer pipeline 642 in the second mode. Second, each slot of queue sub-stage 632 beyond the first stage is redundant, and CPU core 400 reduces the size of each queue sub-stage 632 by half. For example, the size of queue sub-stage 632 can be reduced from twenty-four slots to twelve slots. Third, the second half of decode/dispatch/rename stage 620 is redundant since decode/dispatch/rename stage 620 decodes two instructions in parallel. CPU core 400 disables the redundant half of decode/dispatch/rename stage 620 such that it can only issue a single instruction per clock cycle. Fourth, the effective sizes of caches 415 and 460 can be reduced, such as by half. FIG. 6 shows the disabling of these redundant resources in the second sub-stage of fetch stage 610, and in the second sub-stage of execute sub-stage 636 of load/store pipeline 648, in response to receiving a signal from functional throttling circuit 456 labeled "DISABLE". By reducing the cache size in half, the power consumed in performing associative lookups and in maintaining valid data is reduced.

In this way, pipeline 600 is able to fully execute the instruction set of CPU core 400, but to consume less power for low intensity tasks. Moreover, when CPU core 400 transitions from the first mode to the second mode, each pipeline can transition seamlessly. For example, when disabling a redundant half of decode/dispatch/rename stage 620, the hardware may simply disable sub-stages in the unneeded half as the last instruction flows down decode/dispatch/rename stage 620. Moreover, CPU core 400 can allow the size of each queue sub-stage to be reduced by stalling decode/dispatch/rename stage 620 until only half of the slots are used, and then disabling the unused half. CPU core 400 can also disable a redundant pipeline by stopping the input of new decoded instructions into the pipeline and waiting until the pipeline naturally drains. Moreover CPU core 400 can reduce the sizes of instruction and data caches. In these ways, CPU core 400 can transition from the first (big core) mode to the second (little core) mode seamlessly and without the need for slow instruction migration.

Figure 7:
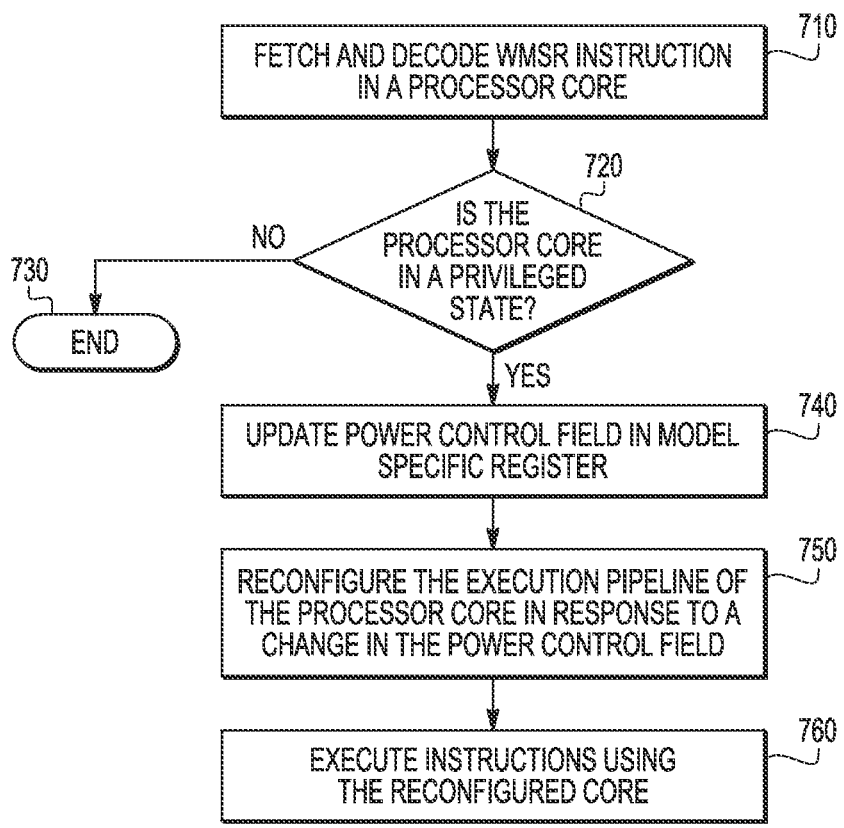
FIG. 7 illustrates a flow diagram of a method for configuring a processor core according to some embodiments.

FIG. 7 illustrates a flow diagram of a method 700 for configuring a processor core according to some embodiments. Action box 710 includes fetching and decoding a write MSR instruction ("WMSR") in a processor core. The flow proceeds to decision box 720, which determines whether CPU core 400 is in a privileged state. If the CPU core 400 is not in a privileged state, flow proceeds to action box 730 in which the method ends by some appropriate action, such as taking a privilege mode violation exception. If the processor core is in a privileged state, then flow proceeds to action box 740, which updates a power control field in the MSR.

Continuing on, method 700 proceeds to action box 750, which reconfigures the execution pipeline of CPU core 400 in response to a change in the power control field. Finally flow proceeds to action box 760 in which CPU core 400 executes instructions using the reconfigured core.

Figure 8:
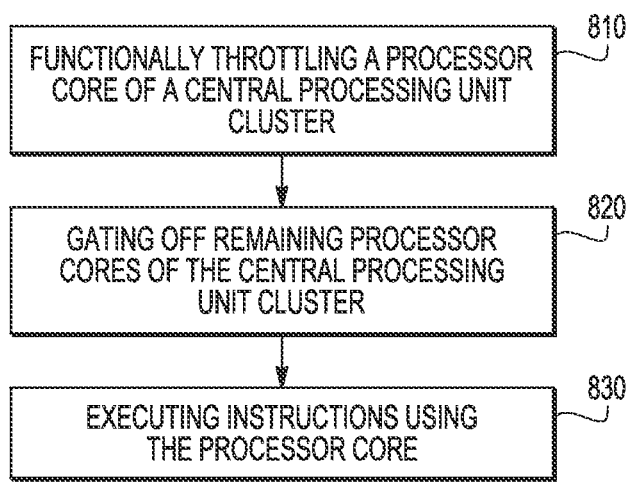
FIG. 8 illustrates a flow diagram of a method for configuring a multi-core data processor according to some embodiments.

FIG. 8 illustrates a flow diagram of a method 800 for configuring a multi-core data processor according to some embodiments. Action box 810 includes functionally throttling a processor core of a CPU cluster. Action box 820 includes gating off remaining processor cores of the CPU cluster. Action box 830 includes executing instructions using the processor core that was enabled.

The functions of FIGS. 3-6 may be implemented with various combinations of hardware and software, and the software component may be stored in a computer readable storage medium for execution by at least one processor. Moreover the methods illustrated in FIGS. 7 and 8 may also be governed by instructions that are stored in a computer readable storage medium and that are executed by at least one processor. Each of the operations shown in FIGS. 7 and 8 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Moreover, the functions of FIGS. 3-6 may be described or represented by a computer accessible data structure in the form of a database or other data structure which can be read by a program and used, directly or indirectly, to fabricate integrated circuits of FIGS. 3-6. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising integrated circuits of FIGS. 3-6. The netlist may then be placed and routed to produce a data set describing geometric shapes to be applied to masks. The masks may then be used in various semiconductor fabrication steps to produce integrated circuits of FIGS. 3-6. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, in the illustrated embodiment, CPU cluster 310 includes four CPU cores 312, 314, 316, and 318, and a cache 320, which is a shared L2 cache. In some embodiments, CPU cluster 310 could include a different number of cores, and different cache memory hierarchies, including shared and dedicated cache memories. CPU cores 312, 314, 316, and 318 could use a common circuit design and process technology or different circuit design and process technologies. A software write to register 452 could include selectively executing the write based on whether CPU core 400 is in a privileged state. Also, configuration circuit 450 could reconfigure different redundant functions of a CPU core of CPU cluster 310, including an arithmetic logic unit (ALU), a schedule queue cluster, a FP unit, a multimedia extension unit (MMX), a cache memory, a cache controller, a translation lookaside buffer (TLB), a branch prediction unit, and the like.

Accordingly, it is intended by the appended claims to cover all modifications of the disclosed embodiments that fall within the scope of the disclosed embodiments.

What is claimed is:

1. A data processor comprising:
   an execution unit having a plurality of redundant resources; and
   a configuration circuit having first and second modes, wherein in said first mode, said configuration circuit enables said plurality of redundant resources, and in said second mode, said configuration circuit disables said plurality of redundant resources, wherein said configuration circuit comprises:
      a register having a field for indicating a mode of operation of the data processor, wherein the data processor can modify said register only while in a privileged state; and
      a functional throttling circuit coupled to said field and to said execution unit, to place the data processor in said first mode in response to a first state of said field, and in said second mode in response to a second state of said field.

2. The data processor of claim 1, wherein:
   said register comprises a model specific register.

3. The data processor of claim 1 wherein said execution unit comprises:
   a plurality of execution pipelines,
   wherein in said first mode, said functional throttling circuit enables all of said plurality of execution pipelines, and in said second mode, said functional throttling circuit disables at least one of said plurality of execution pipelines.

4. The data processor of claim 1 further comprising:
   a fetch unit to fetch a stream of instructions; and
   a decode unit coupled between said fetch unit and said execution unit to decode said stream of instructions to provide decoded instructions to said execution unit,
   wherein in said first mode, said configuration circuit enables said decode unit to decode a plurality of instructions in parallel, and in said second mode, said configuration circuit enables said decode unit to decode only one instruction.

5. The data processor of claim 1 wherein said execution unit comprises:
   a plurality of execution pipelines having at least one of said plurality of redundant resources.

6. A data processor comprising:
   a plurality of processor cores;
   each processor core comprising:
      an execution unit having a plurality of redundant resources; and
      a configuration circuit having first and second modes, wherein in said first mode, said configuration circuit enables said plurality of redundant resources, and in said second mode, said configuration circuit disables said plurality of redundant resources, wherein said configuration circuit comprises:
         a register having a field for indicating a mode of operation of the data processor, wherein the data processor can modify said register only while in a privileged state; and
         a functional throttling circuit coupled to said field and to said execution unit, to place the data processor in said first mode in response to a first state of said field, and in said second mode in response to a second state of said field.

7. The data processor of claim 6, wherein:
   said register comprises a model specific register.

8. The data processor of claim 6 further comprising:
   a fetch unit to fetch a stream of instructions; and
   a decode unit coupled between said fetch unit and said execution unit to decode said stream of instructions to provide decoded instructions to said execution unit,
   wherein in said first mode, said configuration circuit enables said decode unit to decode a plurality of instructions in parallel, and in said second mode, said configuration circuit enables said decode unit to decode only one instruction.

9. The data processor of claim 8, further comprising:
   a shared cache coupled to each of said plurality of processor cores.

10. The data processor of claim 9, wherein each processor core further comprises:
    at least one cache coupled to at least one of said fetch unit and said execution unit and to said configuration circuit, wherein in said first mode, each said at least one cache has a first size, and in said second mode, each said at least one cache has a second size smaller than said first size.

11. The data processor of claim 6, wherein said plurality of processor cores comprises four processor cores.

12. The data processor of claim 6, wherein said configuration circuit of each processor core further has a third mode for gating off said processor core.

13. A method comprising:
    fetching and decoding a write instruction to a register in a processor;
    if said processor is in a privileged state:
       updating a field in said register;
       reconfiguring at least one pipeline of a processor core in response to a low power mode input signal; and
       executing a plurality of instructions using said processor core so reconfigured.

14. The method of claim 13 wherein said reconfiguring comprises:
    reducing a width of an execution pipeline.

15. The method of claim 13 wherein said reconfiguring comprises:
    reducing a width of a decode pipeline.

16. The method of claim 13 wherein said reconfiguring comprises:
    disabling an execution pipeline.

17. The method of claim 13, wherein said fetching and decoding said write instruction to said register comprises:
    fetching and decoding a write to model specific register instruction.

18. A method of reducing power consumption of a data processor having a plurality of processor cores, wherein each of the plurality of processor cores has a plurality of pipelines, comprising:
   functionally throttling a first processor core of the plurality of processor cores, said functionally throttling including reconfiguring at least one pipeline of said first processor core;
   gating off remaining processor cores of the plurality of processor cores; and
   subsequently executing a plurality of instructions using said first processor core.

19. The method of claim 18 wherein said reconfiguring comprises:
   reducing a width of an execution pipeline of said first processor core.

20. The method of claim 18 wherein said reconfiguring comprises:
   reducing a width of a decode pipeline of said first processor core.

21. The method of claim 18 wherein said reconfiguring comprises:
   disabling an execution pipeline of said first processor core.

* * * * *